United States Patent
Ohno et al.

(10) Patent No.: US 9,568,661 B2
(45) Date of Patent: Feb. 14, 2017

(54) LIGHT GUIDING BODY AND LIGHTING SYSTEM

(71) Applicant: KABUSHIKI KAISHA TOSHIBA, Minato-ku (JP)

(72) Inventors: Hiroshi Ohno, Yokohama (JP); Mitsuaki Kato, Kawasaki (JP); Tomonao Takamatsu, Kawasaki (JP); Yuichiro Yamamoto, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 35 days.

(21) Appl. No.: 14/627,541

(22) Filed: Feb. 20, 2015

(65) Prior Publication Data

US 2015/0268405 A1 Sep. 24, 2015

(30) Foreign Application Priority Data

Mar. 18, 2014 (JP) ................................. 2014-055395

(51) Int. Cl.
*F21V 7/04* (2006.01)
*F21V 8/00* (2006.01)

(52) U.S. Cl.
CPC ........... *G02B 6/0045* (2013.01); *G02B 6/0001* (2013.01); *G02B 6/002* (2013.01); *G02B 6/0031* (2013.01); *G02B 6/0085* (2013.01)

(58) Field of Classification Search
CPC ..... G02B 6/0001; G02B 6/002; G02B 6/0031; G02B 6/0045; G02B 6/0085; G02B 6/0091
USPC ....................................................... 362/621
See application file for complete search history.

(56) References Cited

U.S. PATENT DOCUMENTS

| 8,602,581 | B1* | 12/2013 | Kaihotsu | ............. G02B 6/0031 362/97.1 |
| 2005/0174802 | A1 | 8/2005 | Wu et al. | |
| 2006/0098247 | A1* | 5/2006 | Sawada | ............. H04N 1/02835 358/478 |
| 2007/0236909 | A1* | 10/2007 | Tamura | ................. B60Q 3/004 362/23.01 |
| 2008/0260328 | A1 | 10/2008 | Epstein | |

(Continued)

FOREIGN PATENT DOCUMENTS

| JP | 2004-319164 A | 11/2004 |
| JP | 2012-212587 A | 11/2012 |

(Continued)

OTHER PUBLICATIONS

Extended European Search Report issued on Aug. 5, 2015 in European Patent Application No. 15151921.2.

*Primary Examiner* — Peggy Neils
*Assistant Examiner* — Alexander Garlen
(74) *Attorney, Agent, or Firm* — Oblon, McClelland, Maier & Neustadt, L.L.P.

(57) ABSTRACT

A light guiding body that guides light includes, a light guiding portion, and an introducing portion including a plane of incidence and a curvature surface connected to the plane of incidence to guide the light to the light guiding portion by being connected to the light guiding portion, wherein an angle $\theta_1$ formed by a line segment connecting a first point on the plane of incidence and a second point on the curvature surface and a normal of the curvature surface at the second point satisfies $\theta_1 \geq \sin^{-1}(1/n)$, where n is an index of refraction of the light guiding body.

8 Claims, 6 Drawing Sheets

(56) References Cited

U.S. PATENT DOCUMENTS

2012/0139403 A1 6/2012 Johnston et al.
2013/0114293 A1* 5/2013 Morino .................. G02B 6/002
                                                                  362/608
2013/0223077 A1 8/2013 Kato et al.

FOREIGN PATENT DOCUMENTS

| JP | 2013-175406 A | 9/2013 |
| WO | WO 2008/035624 A1 | 3/2008 |
| WO | WO 2009/077979 A1 | 6/2009 |

* cited by examiner

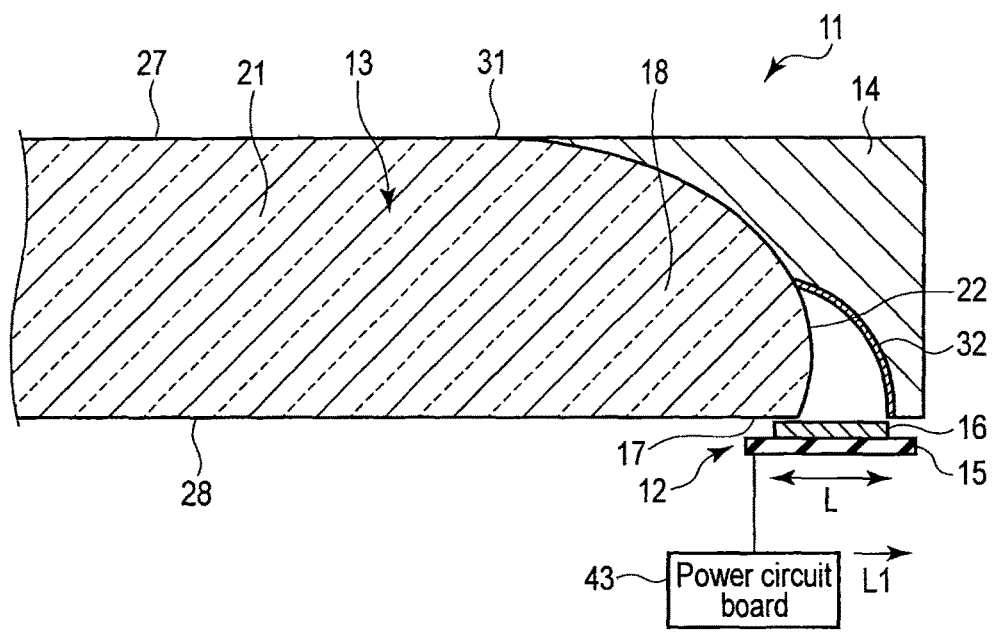
F I G. 1
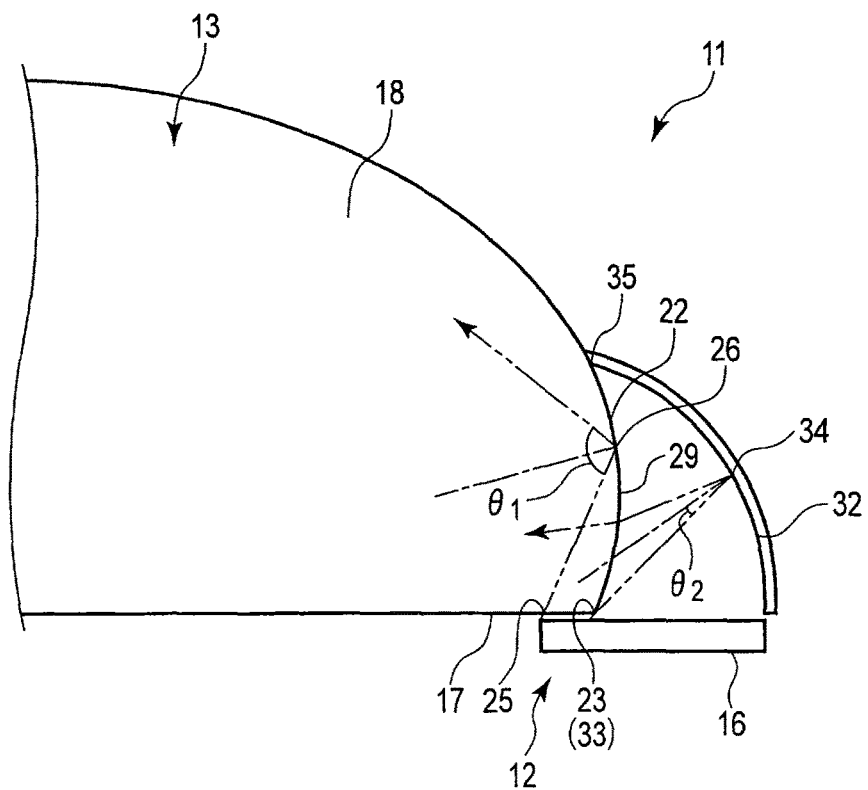
F I G. 2

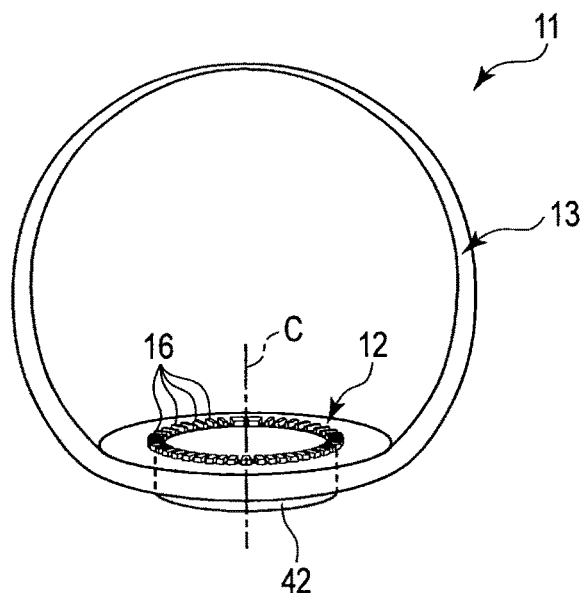
F I G. 4
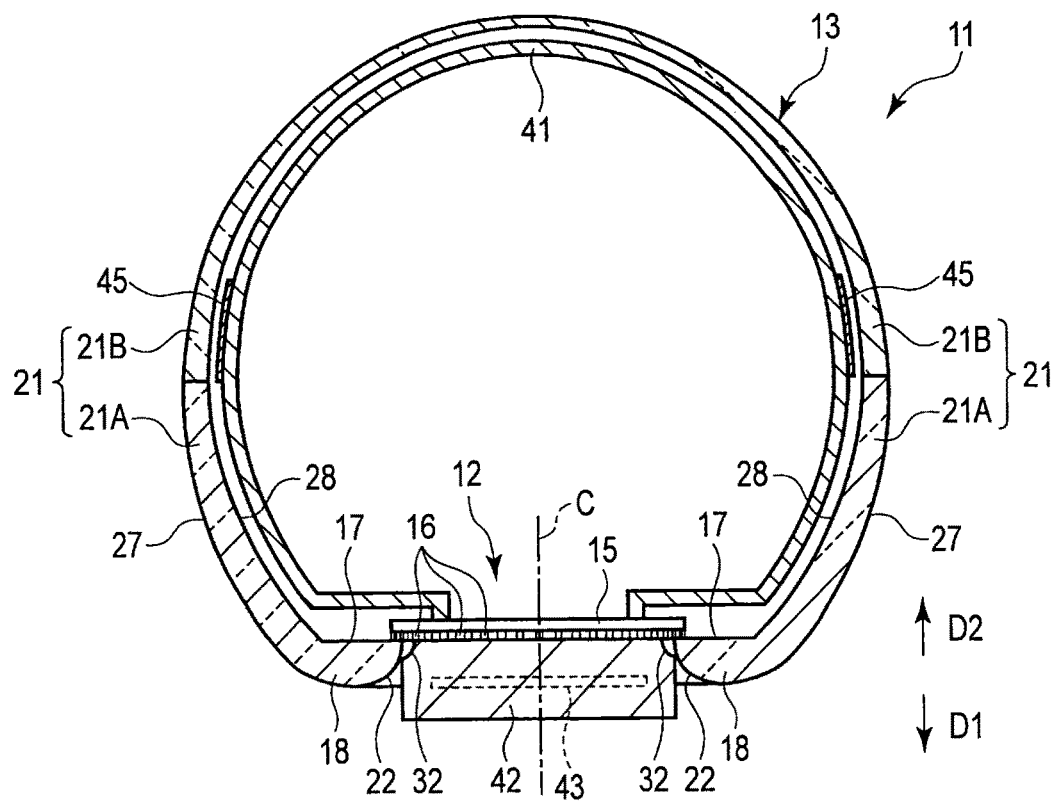
F I G. 5

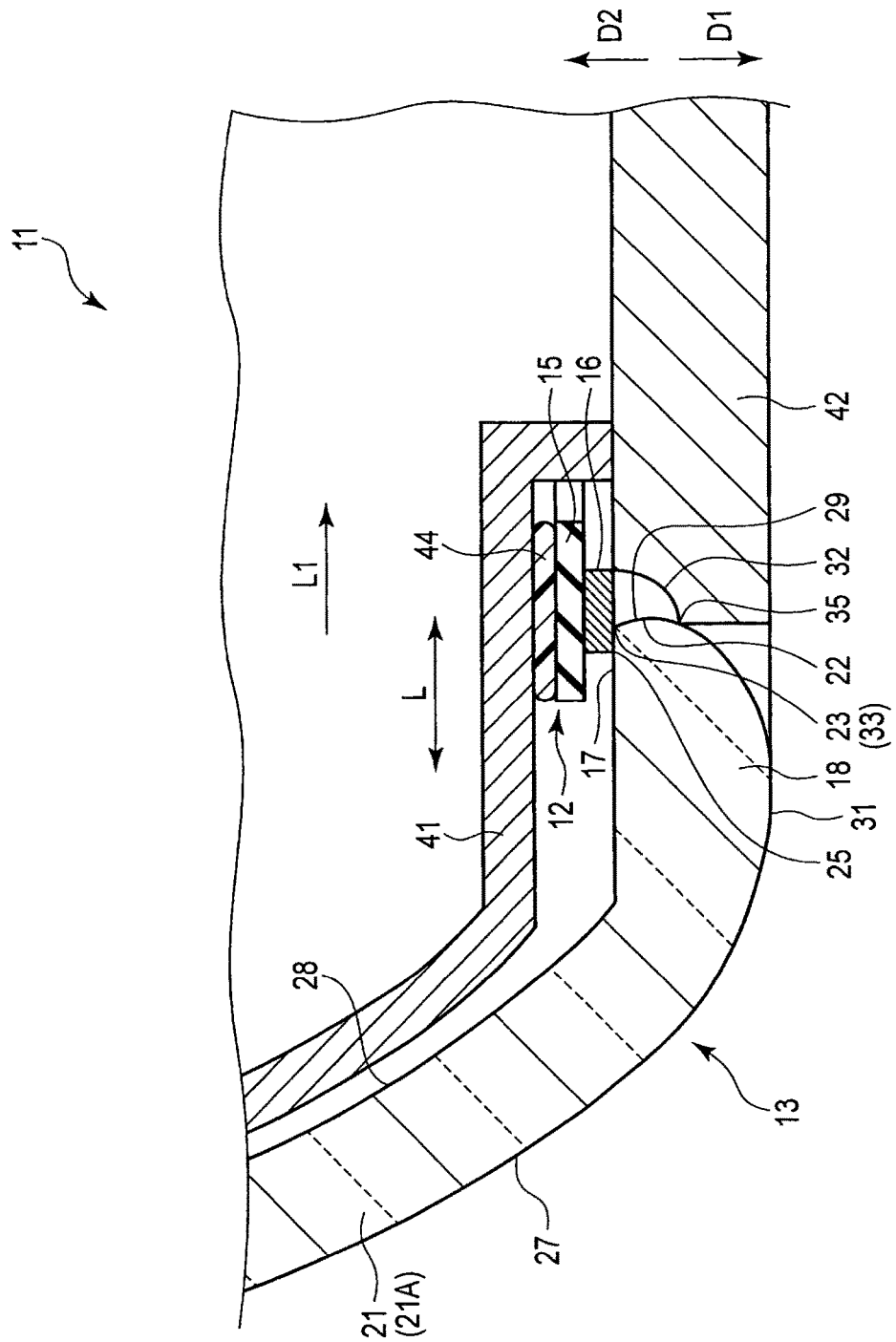
F I G. 6

LIGHT GUIDING BODY AND LIGHTING SYSTEM

CROSS-REFERENCE TO RELATED APPLICATION

This application is based upon and claims the benefit of priority from prior Japanese Patent Application No. 2014-055395, filed Mar. 18, 2014, the entire contents of which are incorporated herein by reference.

FIELD

Embodiments described herein relate generally to a light guiding body that guides light and a lighting system using the light guiding body.

BACKGROUND

There is a type of LED illumination in which light from an LED is guided into a light guiding body and at the same time, the light is diffused and emitted to the outside by a diffuser included in the light guiding body.

For example, a system that uses an LED as a light source and guides light from the light source to a light guiding body using a reflector is known. Based on such a structure, direct light from the LED can be blocked. Thus, glare of direct light can be reduced. However, the reflector made of metal absorbs about 10% of light in one reflection, leading to a lower light output ratio. On the other hand, if the light guiding body is made thicker, the plane of incidence of the light guiding body is increased and the light output ratio can be improved. However, if the light guiding body is made thicker, the weight thereof increases correspondingly and also material costs increase and therefore, a thinner light guiding body is desired.

BRIEF DESCRIPTION OF THE DRAWINGS

FIG. 1 is a sectional view showing a lighting system according to a first embodiment;

FIG. 2 is a schematic diagram showing by enlarging a light source, a light guiding body, and a plane of reflection of the lighting system shown in FIG. 1;

FIG. 4 is a perspective view showing a light source (LED) inside a light guiding body as if seeing through a lighting system according to a second embodiment;

FIG. 5 is a sectional view cutting through a surface of the lighting system shown in FIG. 4 along the center axis of a base;

FIG. 6 is an enlarged sectional view showing an LED of the lighting system shown in FIG. 5 and an introducing portion and a plane of reflection of the light guiding body;

DETAILED DESCRIPTION

[First Embodiment]

Figure 3:
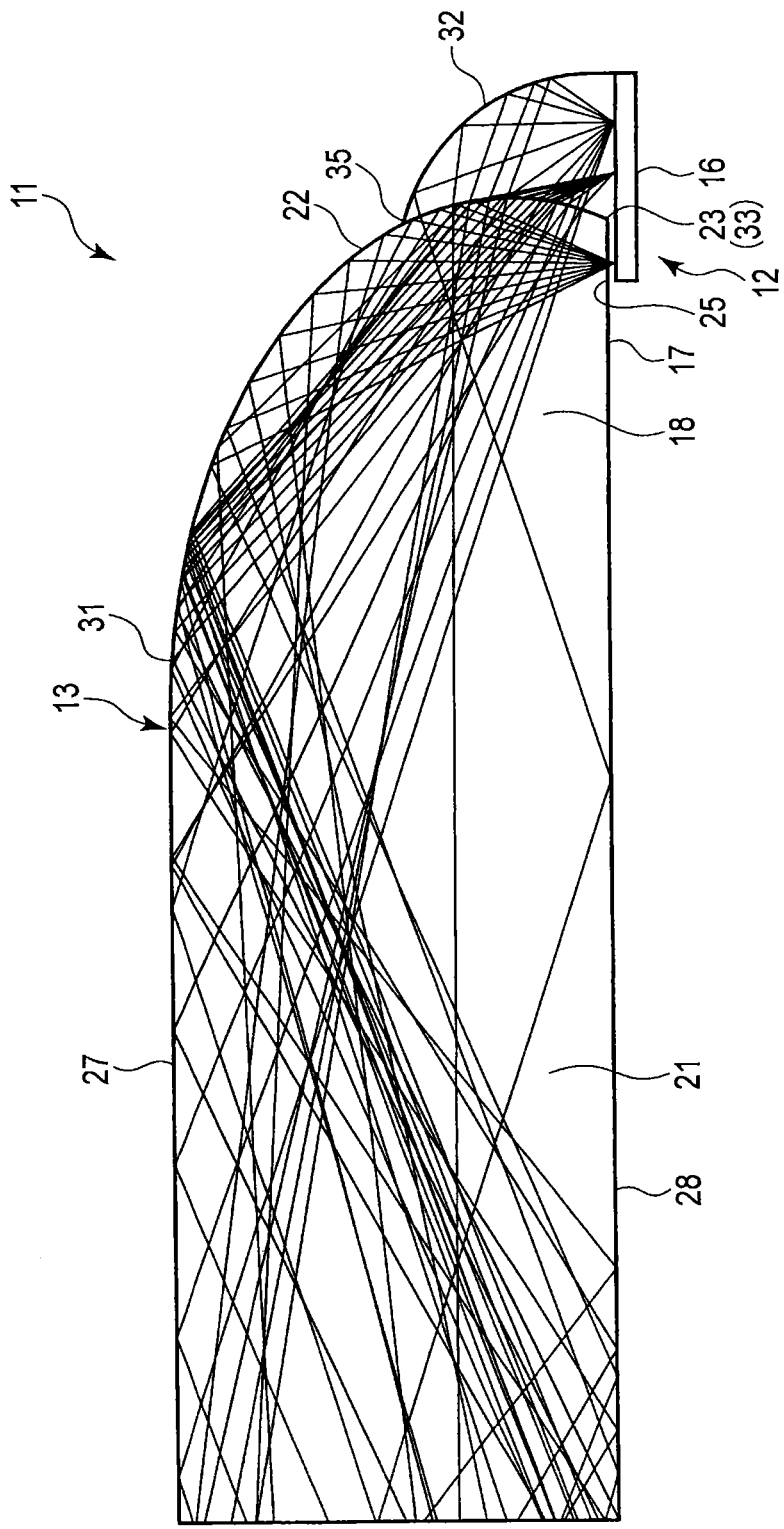
FIG. 3 is a schematic diagram showing light beams passing through the light guiding body and light beams reflected by the plane of reflection in a lighting system shown in FIG. 1.

Hereinafter, the first embodiment of a lighting system will be described with reference to FIGS. 1 to 3. A lighting system 11 according to the first embodiment is used by being mounted on, for example, the surface of a ceiling or installed inside an indentation provided in the ceiling.

As shown in FIG. 1, the lighting system 11 includes a light source 12, a light guiding body 13 into which light from the light source 12 is passed, a base member 14 that supports (holds) the light guiding body 13, and a power circuit board 43 that supplies power to the light source 12.

The light source 12 includes a board 15 (printed wiring board) and a plurality of LEDs 16 (light emitting devices) installed on the board 15. The plurality of LEDs 16 are installed on the board 15, for example, at regular intervals. The LED 16 has the length of, for example, 10 mm in a direction L along a plane of incidence 17 of the light guiding body 13 described later. A portion of the LED 16 is arranged so as to overlap with the plane of incidence 17 in the direction L along the plane of incidence 17. The other portion of the LED 16 is arranged deviating from the plane of incidence 17 of the light guiding body 13 in the direction L along the plane of incidence 17. A small gap (about 0.5 mm) is provided between the LED 16 and the plane of incidence 17. However, the gap is not limited to the above example.

The light guiding body 13 includes an introducing portion 18 on which light from the light source 12 is incident and a light guiding portion 21 connected to the introducing portion 18. The light guiding body 13 including the introducing portion 18 and the light guiding portion 21 is integrally formed from a transparent material like, for example, acrylic. However, the material of the light guiding body 13 is not limited to acrylic and may be polycarbonate, glass or the like. When the light guiding body 13 is formed from acrylic, the index of refraction n is 1.49.

As shown in FIGS. 1 and 2, the introducing portion 18 includes the plane of incidence 17 opposite to the light source 12, a curvature surface 22 connected to the plane of incidence 17, and a first junction 23 positioned on a border between the plane of incidence 17 and the curvature surface 22. The plane of incidence 17 is smoothly formed along an emission surface of the LED 16 (light emitting device) and the board 15. The curvature surface 22 is provided so as to be contiguous with the plane of incidence 17. The curvature surface 22 is curved such that a convex curved surface is formed in a direction along the plane of incidence 17 toward a direction L1 moving away from the light guiding portion 21 (opposite direction of the light guiding portion 21). In the present embodiment, the plane of incidence 17 is provided at a position deviating from an apex 29 of the curved surface formed by the curvature surface 22. The apex is a point where the value becomes maximum with respect to the axis whose positive direction is the direction L1. In other words, the curvature surface 22 is formed by including the apex position of the curved surface. In addition, a portion of the introducing portion 18 (a portion of the curvature surface 22 and a portion of the plane of incidence 17) projects between the light source 12 and a plane of reflection 32.

The curvature surface 22 is formed as a curve satisfying the following condition. The curvature surface 22 is formed such that an angle $\theta_1$ formed by a line segment connecting a first point 25 on the plane of incidence 17 and a second point 26 on the curvature surface 22 and a normal (here, the normal is directed toward the inner surface of the light guiding body) of the curvature surface 22 at the second point 26 satisfies $$\theta_1 \geq \sin^{-1}(1/n) \qquad \text{Formula (1)}$$

where n is an index of refraction of the light guiding body 13. In this case, the first point 25 is provided on the plane of incidence 17 at a position of an end of the light source (LED) opposite to the side of the light guiding portion 21. According to Formula (1), the curvature surface 22 is curved such that light incident from the plane of incidence 17 is totally reflected to the side of the light guiding portion 21. Total reflection is a physical phenomenon in which when a light beam travels from a region of a higher index of refraction to a region of a lower index of refraction, the light beam is almost 100% reflected at the interface formed by these regions if the angle formed by a normal direction of the interface and a light beam direction is equal to a critical angle or more.

The light guiding portion 21 is formed in, for example, a plate shape and includes one surface 27 positioned on the side of the curvature surface 22 and another surface 28 opposite to the one surface 27. The light guiding portion 21 has a length (thickness) of, for example, 20 mm in a direction (thickness direction) crossing the one surface 27 and the other surface 28. The light guiding body 13 has a second junction 31 on the border between the curvature surface 22 and the one surface 27. The one surface 27 is smoothly connected to the curvature surface 22 via the second junction 31. Thus, light leakage near the second junction 31 is prevented. Accordingly, luminance unevenness is prevented from occurring at the second junction 31. In addition, the direction of normal of the curvature surface 22 and the one surface 27 at the second junction 31 matches the direction of the normal of the plane of incidence 17.

The other surface 28 is provided on the side of the plane of incidence 17 and formed of, for example, a plane contiguous with the plane of incidence 17. The other surface 28 is formed of, for example, a diffusion surface capable of diffusing light toward the side of the one surface 27. On the diffusion surface, minute unevenness is formed by a surface treatment such as sandblasting. Incidentally, the other surface 28 is not limited to the surface formed as a diffusion surface and may be formed by attaching scatterers to the surface. Alternatively, the diffusion surface or scatterers may be provided on the side of the one surface 27.

The base member 14 is formed from a metallic material (such as an aluminum alloy). The base member 14 includes the plane of reflection 32. The plane of reflection 32 is formed by mirror-finishing the surface of the base member 14. The plane of reflection 32 may also be formed by forming the base member 14 from a resin such as an ABS resin, depositing aluminum on the surface of the base member 14, and then mirror-finishing the aluminum deposited surface.

The plane of reflection 32 (alternatively, we call it the surface of reflection 32) is curved such that a convex curved surface is formed in a direction along the plane of incidence 17 toward a direction L1 moving away from the light guiding portion 21 (opposite direction of the light guiding portion 21). The plane of reflection 32 is formed in a curvature larger than that of the curvature surface 22 of the light guiding body 13. The plane of reflection 32 is provided near the curvature surface 22 and opposed to a portion of the light source 12 (LED 16) that is different from a portion thereof opposed to the plane of incidence 17.

The plane of reflection 32 is formed as a curve satisfying the following condition. As shown in FIG. 2, the plane of reflection 32 is formed such that an angle $\theta_2$ formed by a line segment connecting a third point 33 on the plane of incidence 17 and a fourth point 34 on the plane of reflection 32 and a normal (here, the normal is directed toward the side of the LED 16) of the surface of reflection 32 at the fourth point 34 satisfies $$\theta_2 < \sin^{-1}(1/n) \quad \text{Formula (2)}$$

where n is the index of refraction of the light guiding body 13. In this case, the third point 33 matches the first junction 23 positioned on the border between the plane of incidence 17 and the curvature surface 22. The fourth point 34 is any point on the surface of reflection 32.

The curvature surface 22 and the plane of reflection 32 are joined by a singular point 35. The singular point 35 is a point that is not continuously connected (point where the geometrical shape is not differentiable). Thus, the curvature surface 22 and the plane of reflection 32 are not smoothly connected. If the curvature surface 22 and the plane of reflection 32 are not connected by the singular point 35, an opening is created and light beams from LED escape from the opening, leading to losses. That is, light beams emitted from the LED 16 can efficiently be guided to the light guiding body 13 by the plane of reflection 32 and the curvature surface 22 being sealed by the singular point 35. In addition, the plane of reflection 32 and the curvature surface 22 can be firmly fixed by the singular point 35.

Subsequently, the working of the lighting system 11 according to the present embodiment will be described with reference to FIG. 3 and the like. In FIG. 3, light radiated from the LED 16 is shown as solid lines. In the present embodiment, a portion of light radiated from the LED 16 is directly radiated into the introducing portion 18 via the plane of incidence 17. At this point, the angle (angle of incidence) θ formed by the line segment connecting the first point 25 on the plane of incidence 17 and the second point 26 on the curvature surface 22 and the normal of the curvature surface 22 at the second point 26 is, as shown in Formula (1), equal to the critical angle or more (see FIG. 2). Thus, light radiated from the LED 16 and passing through the first point 25 of the plane of incidence 17 is totally reflected by the curvature surface 22. Accordingly, the light is guided to the light guiding portion 21 without leaking out.

Similarly, the angle of incidence of light radiated from the LED 16 and passing through between the first point 25 of the plane of incidence 17 and the first junction 23 with respect to the curvature surface 22 is larger than that of light passing through the first point 25 and with which the curvature surface 22 is irradiated. Thus, the light passing through between the first point 25 of the plane of incidence 17 and the first junction 23 has an angle of incidence on the curvature surface 22 equal to the critical angle or more and so is totally reflected by the curvature surface 22. That is, light passing through between the first point 25 and the first junction 23 can also be guided to the light guiding portion 21 without leaking out on the way.

The plane of reflection 32 is irradiated with light emitted from the LED 16 at a position deviating from the plane of incidence 17. The plane of reflection 32 can reflect about 90% of light with which the plane of reflection 32 is irradiated to the side of the curvature surface 22 (about 10% of light with which the plane of reflection 32 is irradiated is absorbed by the plane of reflection 32). Light reflected by the plane of reflection 32 is incident on the curvature surface 22 before passing through the introducing portion 18. Light passing through the introducing portion 18 is guided toward the light guiding body 13 without leaking out on the way. This is because light reaching the curvature surface 22 is refracted by the curvature surface 22 before entering the introducing portion 18 and the angle formed by the direction of light immediately after entering the introducing portion and the normal direction of the curvature surface 22 always converges to a range equal to or less than the critical angle and the light travels toward the light guiding body 13. That is, light incident on the curvature surface 22 converges to a direction toward the light guiding body 13.

Light guided to the light guiding portion 21 is diffused by the other surface 28 as a diffusion surface and radiated to the outside via the one surface 27. In the present embodiment, therefore, both of light directly entering the introducing portion 18 from the light source 12 via the plane of incidence 17 and light indirectly entering the introducing portion 18 via the plane of reflection 32 can be guided to the light guiding portion 21 and so the light output ratio can be increased to about 95%.

According to the first embodiment, the light guiding body 13 is the light guiding body 13 that guides light, includes the light guiding portion 21, the plane of incidence 17, and the curvature surface 22 connected to the plane of incidence 17 and also includes the introducing portion 18 connected to the light guiding portion 21 to guide light to the light guiding portion 21 and, if the index of refraction of the light guiding body 13 is n, the angle $\theta_1$ formed by the line segment connecting the first point 25 on the plane of incidence 17 and the second point 26 on the curvature surface 22 and the normal of the curvature surface 22 at the second point 26 satisfies $\theta_1 \geq \sin^{-1}(1/n)$.

According to the above configuration, the angle of incidence with respect to the curvature surface 22 of light reaching the curvature surface 22 by passing through the plane of incidence 17 can be made equal to the critical angle or more. Accordingly, light can be caused to be totally reflected by the curvature surface 22 and light can be prevented from leaking out of the light guiding body 13. Further, in contrast to a case when light is reflected by a reflector made of metal, there is no loss by absorption when reflected by the plane of reflection during total reflection. From the above, the light output ratio can be improved.

The curvature surface 22 is curved such that a convex curved surface is formed in a direction along the plane of incidence 17 toward the direction L1 moving away from the light guiding portion 21. According to this configuration, a structure that causes the curvature surface 22 to totally reflect light can be realized by using a simple structure.

In this case, the lighting system 11 includes the light guiding body 13 and the light source 12 provided at a position opposite to the plane of incidence 17 and the first point 25 is opposed to the end of the LED 16 on the side of the light guiding portion 21. According to the above configuration, the angle of incidence with respect to the curvature surface 22 of light entering the plane of incidence 17 after being emitted from the light source 12 can be made equal to the critical angle or more in the range from a boundary point between the plane of incidence 17 and the curvature surface 22 to the first point 25 by specifying the first point as described above in relation to Formula (1). Accordingly, light reaching the curvature surface 22 can be caused to be totally reflected.

The lighting system 11 includes the light source 12 irradiating the plane of incidence 17 with light and the plane of reflection 32 reflecting light emitted from the light source 12 by deviating from the plane of incidence 17 toward the curvature surface 22 and the angle $\theta_2$ formed by the line segment connecting the third point 33 on the plane of incidence 17 and the fourth point 34 on the plane of reflection 32 and the normal of the surface of reflection 32 at the fourth point 34 satisfies $\theta_2 < \sin^{-1}(1/n)$.

According to the above configuration, the curvature of the plane of reflection 32 can be made larger than that of the curvature surface 22. Thus, the plane of reflection 32 can be formed compactly and the lighting system 11 can be configured to be compact and thin.

The plane of reflection 32 is curved such that a convex curved surface is formed in a direction along the plane of incidence 17 toward the direction L1 moving away from the light guiding portion 21. According to the above configuration, a configuration capable of efficiently reflecting light toward the curvature surface 22 can be realized by using a simple structure.

The lighting system 11 has the second junction 31 positioned between the curvature surface 22 and the one surface 27 and the direction of normal of the curvature surface 22 and the one surface 27 at the second junction 31 matches the direction of the normal of the plane of incidence 17. According to the above configuration, the light guiding body 13 can be formed by forming the curvature surface 22 by cutting an end of one plate. Accordingly, the manufacturing cost can be reduced by simplifying the manufacturing process of the light guiding body 13.

The curvature surface 22 and the plane of reflection 32 are joined by the singular point 35. According to the above configuration, the direction of light beams can be made discontinuous across the singular point 35. Accordingly, the radiation direction of light beams passing through the light guiding body 13 can be diversified and also the direction of light emitted from the light guiding body in the end can be diversified. That is, widely distributed light can be realized.

Further, the curvature surface 22 of the light guiding body 13 is preferably formed as a curve satisfying the following condition. That is, the curvature surface 22 is formed such that the angle $\theta_1$ formed by the line segment connecting the first point 25 on the plane of incidence 17 and the second point 26 on the curvature surface 22 and the normal of the curvature surface 22 at the second point 26 satisfies $$\theta_1 = \sin^{-1}(1/n) \qquad \text{Formula (3)}$$

where n is the index of refraction of the light guiding body 13 (Condition 1).

According to Condition 1, $\theta_1$ can be minimized while satisfying the total reflection condition and the curvature surface 22 and the introducing portion 18 can be formed most compactly (thinly). Accordingly, the lighting system 11 can be configured to be compact (thin).

Further, the plane of reflection 32 is preferably formed as a curve satisfying the following condition. That is, the plane of reflection 32 is preferably formed such that the angle $\theta_2$ formed by the line segment connecting the third point 33 on the LED 16 of the light source 12 and the fourth point 34 on the plane of reflection 32 and the normal of the surface of reflection 32 at the fourth point 34 satisfies $\theta_2=0$ or $\theta_2 \approx 0$ (Condition 2). According to Condition 2, the lighting system 11 can be configured to be compact (thin) by making the plane of reflection 32 as compact as possible.

[Second Embodiment]

Subsequently, the second embodiment of a lighting system will be described with reference to FIGS. 4 to 8. Hereinafter, portions that are different from the first embodiment will mainly be described and the illustration or description of portions common to the first embodiment will be omitted. A lighting system 11 according to the second embodiment is of a so-called bulb type.

As shown in FIGS. 4 and 5, the lighting system 11 includes a light source 12, a light guiding body 13 into which light from the light source 12 is passed, a heat transfer portion 41 in a spherical shape housed inside the light guiding body 13, a base 42 (base member) that supports (holds) the light guiding body 13 and the heat transfer portion 41, and a power circuit board 43 that supplies power to the light source 12.

Figure 7:
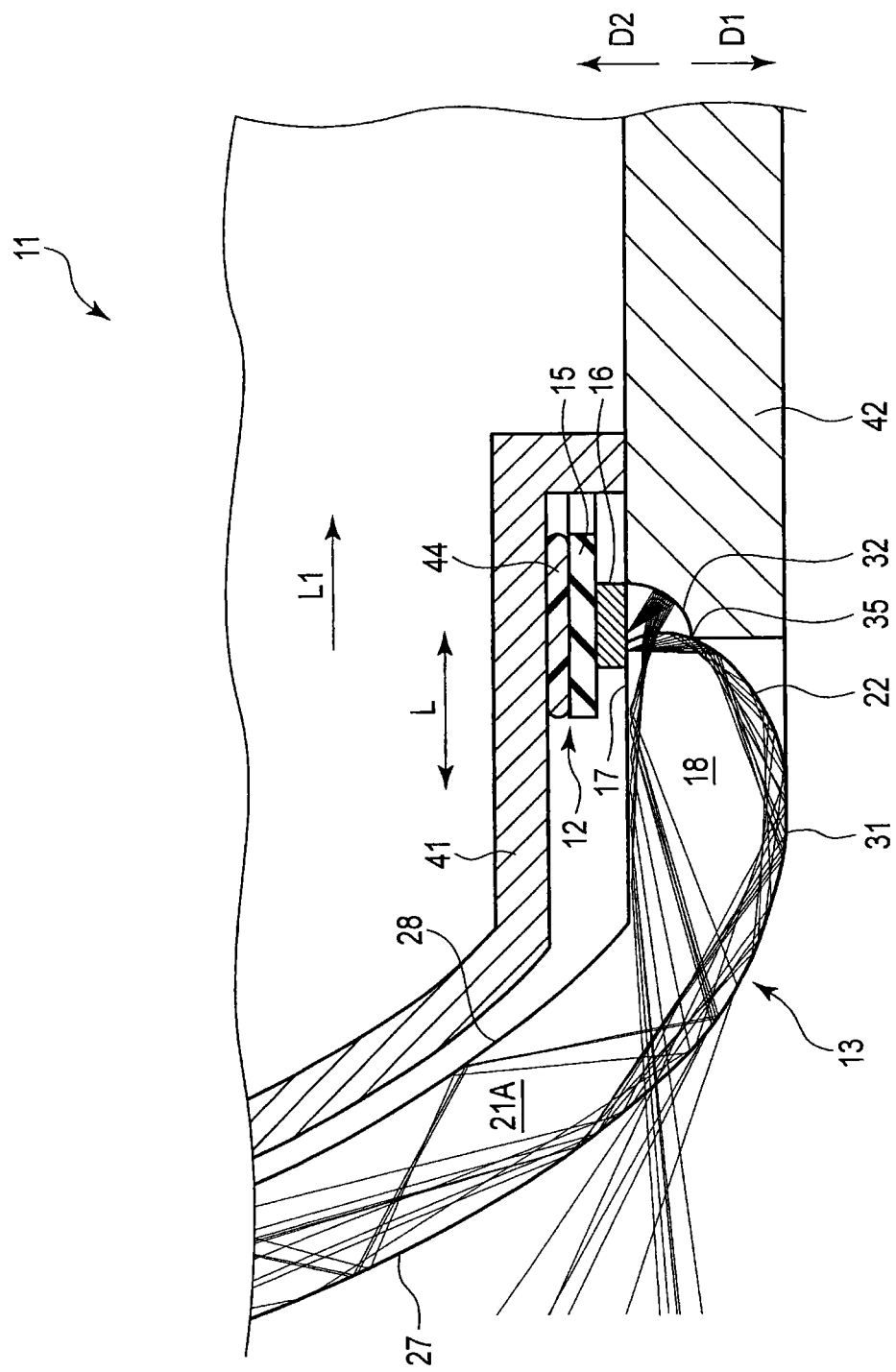
FIG. 7 is a sectional view showing light beams passing through the light guiding body in the sectional view shown in FIG. 6.

The light source 12 includes a board 15 (printed wiring board) and a plurality of LEDs 16 (light emitting devices) installed on the board 15. The plurality of LEDs 16 are installed on the board 15 (printed wiring board), for example, at regular intervals. The plurality of LEDs 16 are arranged in a circle around a center axis C of the base 42. As shown in FIG. 6, a portion of the LED 16 is arranged so as to overlap with a plane of incidence 17 of the light guiding body 13 in a direction L along the plane of incidence 17. The other portion of the LED 16 is arranged deviating from the plane of incidence 17 of the light guiding body 13 in the direction L along the plane of incidence 17. A small gap (for example, about 0.5 mm) is provided between the LED 16 and the plane of incidence 17. As shown in FIG. 7, the light source 12 (LED 16) can radiate light in the direction of the base 42 (direction D1 in which the base 42 projects).

In the present embodiment, as shown in FIGS. 4 and 5, a light guiding portion 21 is formed, for example, in a hollow spherical shape as a whole. More specifically, the light guiding body 13 forms a shape partially following a sphere of 60 mm in diameter and this is a shape similar to an incandescent lamp.

The light guiding body 13 includes an introducing portion 18 positioned near the base 42 and on which light from the light source 12 is incident and the light guiding portion 21 connected to the introducing portion 18. The light guiding body 13 including the introducing portion 18 and the light guiding portion 21 is integrally formed from a transparent material like, for example, acrylic. However, the material of the light guiding body 13 is not limited to acrylic and may be polycarbonate, glass or the like.

The form of the introducing portion 18 is the same as in the first embodiment. As shown in FIG. 7, the introducing portion 18 includes the plane of incidence 17 opposite to the light source 12, a curvature surface 22 connected to the plane of incidence 17, and a first junction 23 (see FIG. 6) positioned on the border between the plane of incidence 17 and the curvature surface 22. The plane of incidence 17 is smoothly formed along an emission surface of the LED 16 (light emitting device) and the board 15. As shown in FIG. 5, the plane of incidence 17 crosses (is at right angles to) the center axis C of the base 42 in a cylindrical shape.

As shown in FIG. 6, the curvature surface 22 is provided so as to be contiguous with the plane of incidence 17. The curvature surface 22 is curved such that a convex curved surface is formed in a direction along the plane of incidence 17 toward a direction L1 moving away from the light guiding portion 21 (direction approaching the center axis C of the base 42). In the present embodiment, the plane of incidence 17 is provided at a position deviating from an apex 29 of the curved surface formed by the curvature surface 22. In other words, the curvature surface 22 is formed by including the apex position of the curved surface. The curvature surface 22 is formed as a curve satisfying Formula (1) shown in the first embodiment. The curvature surface 22 is curved such that light incident from the plane of incidence 17 is totally reflected to the side of the light guiding portion 21.

A portion of the introducing portion 18 (a portion of the curvature surface 22 and a portion of the plane of incidence 17) projects between the light source 12 and a plane of reflection 32.

As shown in FIG. 5, the light guiding portion 21 projects in a spherical shape in a direction D2 opposite to the direction D1 in which the base 42 projects. The light guiding portion 21 includes a first portion 21A in a semispherical shape formed integrally with the introducing portion 18 and a second portion 21B in a semispherical shape joined to the first portion 21A using an adhesive or the like. However, the light guiding portion 21 may be integrally molded without such a joint. The light guiding portion 21 includes one surface 27 as an outer circumferential surface and another surface 28 as an inner circumferential surface opposite to the one surface 27. As shown in FIG. 6, the light guiding body 13 has a second junction 31 on the border between the curvature surface 22 and the one surface 27.

The other surface 28 is formed of, for example, a diffusion surface that diffuses light. On the diffusion surface, minute unevenness is formed by a surface treatment such as sandblasting. The other surface 28 is not limited to the surface formed as a diffusion surface and may be formed by attaching scatterers to the surface. The other surface 28 is smoothly contiguous with, for example, the plane of incidence 17. The one surface 27 of the light guiding portion 21 may be coated with, for example, fluororesin. The coating of fluororesin can prevent attachment of fingerprints to the other surface 28 or damage of the other surface 28. Alternatively, the diffusion surface or scatterers may be provided on the side of the one surface 27.

The base 42 is formed from a metallic material (such as an aluminum alloy). As shown in FIG. 6, the base 42 includes the plane of reflection 32. The light source 12, the light guiding body 13, and the power circuit board 43 are mounted on the base 42 and the heat transfer portion 41. The power circuit board 43 may be provided inside the heat transfer portion 41. The plane of reflection 32 is formed by mirror-finishing. The plane of reflection 32 may also be formed by mirror-finishing after aluminum deposition on a resin such as an ABS resin.

As shown in FIG. 6, the plane of reflection 32 is curved such that a convex curved surface is formed in a direction along the plane of incidence 17 toward the direction L1 moving away from the light guiding portion (direction approaching the center axis C of the base 42). The plane of reflection 32 is formed in a curvature larger than that of the curvature surface 22 of the light guiding body 13. The plane of reflection 32 is formed as a curve satisfying Formula (2) shown in the first embodiment. The plane of reflection 32 is provided near the curvature surface 22 and opposed to a portion of the light source 12 (LED 16) that is different from a portion thereof opposed to the plane of incidence 17.

The heat transfer portion 41 is formed from, for example, an aluminum alloy in a spherical shape. The heat transfer portion 41 may be physically fixed and thermally connected to the base 42. The heat transfer portion 41 is thermally connected to the board 15 of the light source 12 via, for example, a sheet 44 with high thermal conductivity and elasticity. Thus, heat generated in the light source 12 is transferred to the base 42 and the heat transfer portion 41 before being dissipated to the outside via the surrounding air and the light guiding body 13. The heat transfer portion 41 may be directly in contact with the board 15 without the aid of the sheet 44.

The outer circumferential surface of the heat transfer portion 41 is coated white, but may also be coated in other colors (blue, yellow, green, red, pink, orange, black or other colors) or the coating may be omitted to expose the color of the aluminum alloy. Various paints can be used as a paint used to coat the outer circumferential surface of the heat transfer portion 41 with the paint and the paint may be a paint that changes in color depending on the temperature or a paint that glows in the dark (luminous paint) when the lighting system 11 is turned off.

As shown in FIG. 5, the heat transfer portion 41 further includes a marking surface 45 (marking portion) formed by coating the surface with paint. For example, a trademark or logo of a company, a product name, a model number, notes such as "Hot", or a description of a product can be marked on the marking surface 45. Because the light guiding body 13 is transparent, the user can visually recognize the coating of the outer circumferential surface of the heat transfer portion 41 and the marking surface 45 from the outside. When the lighting system 11 is turned on, on the other hand, the light guiding body 13 emits light and so it is difficult to visually recognize the coating of the outer circumferential surface of the heat transfer portion 41 and the marking surface 45 inside the light guiding body from the outside. Therefore, when the lighting system is turned on, uniform illumination is obtained without light being blocked by the marking surface 45.

Subsequently, the working of the lighting system 11 according to the present embodiment will be described with reference to FIGS. 6 and 7 and the like. In the present embodiment, a portion of light radiated from the LED 16 directly enters the introducing portion 18 via the plane of incidence 17. At this point, the angle (angle of incidence) $\theta_1$ formed by a line segment connecting a first point 25 on the plane of incidence 17 and a second point 26 on the curvature surface 22 and a normal of the curvature surface 22 at the second point 26 is, as shown in Formula (1), equal to a critical angle or more (see FIG. 2). Thus, light emitted from the LED 16 and passing through the first point 25 of the plane of incidence 17 is totally reflected by the curvature surface 22. Accordingly, the light is guided to the light guiding portion 21.

Similarly, the angle of incidence of light radiated from the LED 16 and passing through between the first point 25 of the plane of incidence 17 and the first junction 23 with respect to the curvature surface 22 is larger than that of light passing through the first point 25 and with which the curvature surface 22 is irradiated. Thus, the light passing through between the first point 25 of the plane of incidence 17 and the first junction 23 has an angle of incidence on the curvature surface 22 equal to the critical angle or more and so is totally reflected by the curvature surface 22. From the above, light passing through between the first point 25 and the first junction 23 can also be guided to the light guiding portion 21.

The plane of reflection 32 is irradiated with light emitted from the LED 16 in a direction deviating from the plane of incidence 17. The plane of reflection 32 can reflect about 90% of light with which the plane of reflection 32 is irradiated to the side of the curvature surface 22 (about 10% of light with which the plane of reflection 32 is irradiated is absorbed by the plane of reflection 32). Light reflected by the plane of reflection 32 is incident from the curvature surface 22 before passing through the introducing portion 18. Light passing through the introducing portion 18 is guided toward the light guiding body 13.

Figure 8:
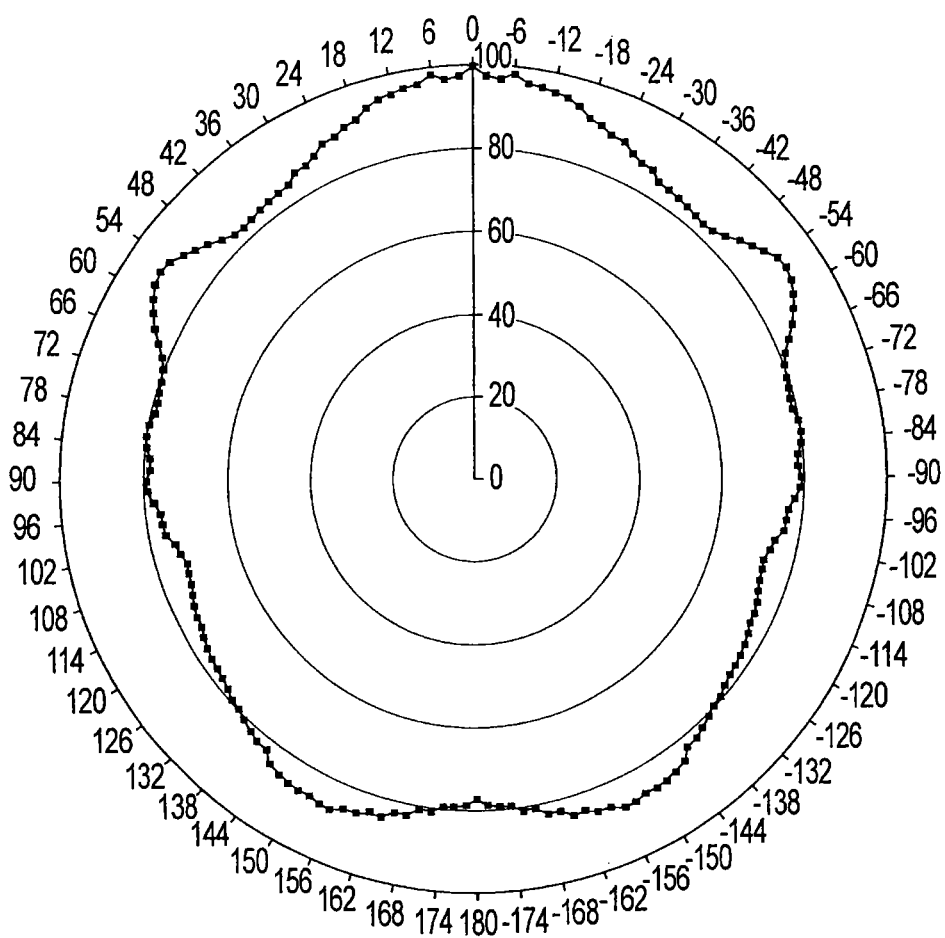
FIG. 8 is a diagram showing a light distribution of the lighting system according to the second embodiment.

Light guided to the light guiding portion 21 is diffused by the other surface 28 as a diffusion surface and radiated to the outside via the one surface 27. In the present embodiment, therefore, both of light with which the introducing portion 18 is irradiated directly from the light source 12 via the plane of incidence 17 and light with which the introducing portion 18 is irradiated indirectly via the plane of reflection 32 can be guided to the light guiding portion 21 and so the light output ratio can be increased to about 82%. As shown in FIG. 8, the 1/2 light distribution angle becomes about 360 degrees. In FIG. 8, the direction directed from the LED 16 to the base 42 corresponds to the position of 180 degrees.

On the other hand, heat generated in the LED 16 is transferred to the base 42 and the heat transfer portion 41. Accordingly, the LED 16 is prevented from overheating beyond the heat-resistant temperature.

According to the present embodiment, the lighting system 11 includes the base 42, the light guiding body 13 having the light guiding portion 21 projecting in a direction opposite to the direction in which the base 42 projects and the introducing portion 18 having the plane of incidence 17 and the curvature surface 22 connected to the plane of incidence 17 and curved so as to be able to totally reflect light entering from the plane of incidence 17 to the side of the light guiding portion 21, and the light source 12 that radiates light in the direction D1 in which the base 42 projects to allow the light to enter the light guiding body 13 from the plane of incidence 17.

According to the above configuration, the light source 12 radiates light in the direction D1 in which the base projects and therefore, a light component that is difficult for the normal lighting system 11 to emit (light component in the direction D1 in which the base 42 projects) can be created. On the other hand, the light having entered the light guiding body 13 is guided to the direction D2 opposite to the direction D1 in which the base 42 projects by the light guiding body 13 and the curvature surface 22 capable of total reflection. Accordingly, light can be emitted in the direction of 360 degrees around the lighting system 11 so that widely distributed light can be realized.

The lighting system 11 is provided near the curvature surface 22 and includes the plane of reflection 32 that reflects light radiated from the light source 12 by deviating from the plane of incidence 17 toward the curvature surface 22. According to the above configuration, a light component reflected by the plane of reflection 32 and incident on the curvature surface 22 can be generated. Accordingly, the direction of light beams guided into the light guiding body 13 can be diversified so that widely distributed light can be realized.

A portion of the introducing portion 18 projects between the light source 12 and the plane of reflection 32. According to the above configuration, a portion of light emitted from the light source 12 can be caused to enter the light guiding portion 21 from the side opposite to the light source 12 of the introducing portion 18 on the plane of incidence 17. At the same time, other light emitted from the light source 12 can be caused to be reflected by the plane of reflection 32 and further, to enter the light guiding body 13 from the curvature surface 22. Accordingly, the lighting system 11 that is highly efficient can be realized and also widely distributed light can be realized by diversifying the direction of light beams passing through the light guiding body 13.

Further, the curvature surface 22 of the light guiding body 13 is preferably formed as a curve satisfying the following condition. That is, the curvature surface 22 is formed such that the angle $\theta_1$ formed by the line segment connecting the first point 25 on the plane of incidence 17 and the second point 26 on the curvature surface 22 and the normal of the curvature surface 22 at the second point 26 satisfies $$\theta_1 = \sin^{-1}(1/n) \qquad \text{Formula (3)}$$

where n is the index of refraction of the light guiding body 13 (Condition 1).

According to Condition 1, $\theta_1$ can be minimized while satisfying the total reflection condition and the curvature surface 22 and the introducing portion 18 can be formed most compactly (thinly). Accordingly, the lighting system 11 can be configured to be compact (thin).

Further, the plane of reflection 32 is preferably formed as a curve satisfying the following condition. That is, the plane of reflection 32 is preferably formed such that the angle $\theta_2$ formed by the line segment connecting a third point 33 on the LED 16 of the light source 12 and a fourth point 34 on the plane of reflection 32 and the normal of the surface of reflection 32 at the fourth point 34 satisfies $\theta_2=0$. Accordingly, the lighting system can be configured to be compact (thin) by making the plane of reflection 32 as compact as possible.

Hereinafter, other inventions than those described in the above embodiments are added.

[1]

A lighting system accommodated inside the light guiding body and including a heat transfer portion having a marking surface on which information is marked.

According to the configuration, information can be marked on the heat transfer portion 41. Thus, various kinds of information (such as enterprise information, product information, and notes) can be communicated to the user while the lighting system 11 is not turned on. When the lighting system 11 is turned on, the light guiding body 13 emits light and the heat transfer portion 41 and the marking surface 45 inside are hidden and therefore, illumination quality is not affected.

[2]

A lighting system accommodated inside the light guiding body and including a heat transfer portion coated with a predetermined paint (a paint that changes color depending on the temperature or a luminous paint) on the surface thereof.

According to the configuration, the portion of the heat transfer portion 41 can also be caused to glow when the lighting system 11 is turned off or information marked for the user can be changed depending on the temperature of the heat transfer portion 41.

Some embodiments of the present invention have been described, but these embodiments are presented by way of example and are not intended to limit the scope of the invention. These embodiments can be carried out in various other forms and various omissions, substitutions, and alterations can be made without deviating from the spirit of the invention. These embodiments and modifications thereof are included in the scope and spirit of the invention and also included in the invention described in the claims and equivalents thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A lighting system comprising:
a light guiding body comprising a light guiding portion, and an introducing portion including a plane of incidence and a curvature surface connected to the plane of incidence, the introducing portion is configured to guide the light to the light guiding portion by being connected to the light guiding portion, wherein an angle $\theta_1$ formed by a line segment connecting a first point on the plane of incidence and a second point on the curvature surface and a normal of the curvature surface at the second point satisfies, $\theta_1 \geq \sin^{-1}(1/n)$, where n is an index of refraction of the light guiding body, the curvature surface is curved to be convex in a direction along the plane of incidence toward the direction moving away from the light guiding portion,
a light source provided at a position opposite to the plane of incidence directly irradiates the plane of incidence, the curvature surface, and a surface of reflection with light; the surface of reflection is curved to be convex in a direction along the plane of incidence toward the direction moving away from the light guiding portion, deviating from the plane of incidence toward the curvature surface, reflecting the portion of light radiated from the light source toward the curvature surface; wherein
an angle $\theta_2$ formed by the line segment connecting a third point on the plane of incidence and a fourth point on the surface of reflection and the normal of the surface of reflection at the fourth point satisfies $$\theta_2 < \sin^{-1}(1/n).$$

2. The lighting system according to claim 1, wherein the third point matches a first junction on a border of the plane of incidence and the curvature surface.

3. The lighting system according to claim 1, wherein $\theta2=0$ holds.

4. The lighting system according to claim 1, further comprising: a second junction positioned between the curvature surface and the surface of reflection, wherein
the direction of the normal of the curvature surface and the surface of reflection at the second junction matches the direction of the normal of the plane of incidence.

5. The lighting system according to claim 4, wherein the curvature surface and the plane of reflection are joined by a singular point.

6. The lighting system according to claim 5, wherein the light guiding portion is in a spherical shape.

7. The lighting system according to claim 6, further comprising: a base, wherein
the light source radiates the light in the direction in which the base projects.

8. The lighting system according to claim 7, further comprising: a heat transfer portion accommodated inside the light guiding body and to which heat from the light source is transferred.

* * * * *